United States Patent [19]

Iwabuchi

[11] Patent Number: 5,033,011

[45] Date of Patent: Jul. 16, 1991

[54] APPARATUS AND METHOD OF CONTROLLING A REFUSE DISPOSAL CRANE

[75] Inventor: Osamu Iwabuchi, Hachioji, Japan

[73] Assignee: Kabushiki Kaisha Toshiba, Kawasaki, Japan

[21] Appl. No.: 398,494

[22] Filed: Aug. 25, 1989

[30] Foreign Application Priority Data

Aug. 29, 1988 [JP] Japan .............................. 63-214112

[51] Int. Cl.[5] .............................................. G06F 15/20

[52] U.S. Cl. ................................ 364/551.01; 364/478

[58] Field of Search .............. 364/551.01, 478, 424.01; 212/270, 81; 414/133, 139.6, 139.7, 138.2, 138.3, 138.4, 141.7, 141.8

[56] References Cited

U.S. PATENT DOCUMENTS

| | | | |
|---|---|---|---|
| 4,218,168 | 8/1980 | Parsons | 414/141.8 |
| 4,486,842 | 12/1984 | hermann | 364/478 |
| 4,504,918 | 3/1985 | Axmann | 364/478 |
| 4,753,357 | 6/1988 | Miyoshi et al. | 364/478 |

*Primary Examiner*—Parshotam S. Lall
*Assistant Examiner*—Michael Zanelli
*Attorney, Agent, or Firm*—Oblon, Spivak, McClelland, Maier & Neustadt

[57] ABSTRACT

Level data indicative of levels of the surface of a dump of refuse in pit are stored for each unit area into level data memory. An angle of an inclination of the refuse dump is obtained by using the level data in a unit area and the level data in unit areas adjacent to it. The inclination angle is compared with an angle of repose of the refuse dump. When the inclination angle is larger than the angle of repose, it is judged that the level data is improper. The level data as judged to be improper is altered so that the inclination angle is below the repose angle. The crane is controlled on the basis of the level data stored in the level data memory.

17 Claims, 5 Drawing Sheets

APPARATUS AND METHOD OF CONTROLLING A REFUSE DISPOSAL CRANE

BACKGROUND OF THE INVENTION

1. Field of the Invention

The present invention relates to an apparatus and method of controlling a crane. More particularly, the present invention relates to an apparatus and method of controlling a refuse disposal crane which is used for lifting and moving refuse or solid wastes, including earth and sand in incinerator plants or at reclamation sites.

2. Description of the Related Art

The refuse disposal plant has a pit for temporarily storing the refuse, a furnace, a crane for lifting and moving the refuse from the pit to the furnace, and a crane controller.

The crane controller contains a level controller for controlling level data indicative of the height of a heap of the refuse accumulated in the pit. The level controller further contains a level memory for storing level data, a computer for computing a level of a piled refuse by using output data from sensors, for example, a position sensor and a load sensor, and device for updating the level data stored in the level memory.

In order to automatically operate the crane by using the level data stored in the level memory, it is important whether the level data stored in the level memory is proper reasonable or correct or improper.

One of the methods which can be used to check the properness of the level data is to check whether or not the level data is within a range between the upper limit and the lower limit, both preset. This approach is unsatisfactory. For example, when something is wrong with the load detector and/or the position detector, the level data difference between the adjacent places of the refuse heap becomes great. In such a case, the above approach cannot recognize the abnormality of the level data so long as the level data is between the upper and the lower limit values. A possible measure for this is that when that level data difference is great, the present level data are displayed on a monitor and an operator sees the display and judges whether the level data is proper or improper. This measure makes the operator's work increase and intricated. Under the condition of improper level data, the refuse disposal unsmoothly progresses and the incinerator plant insteadily operates.

The above problems may also be found in other facilities and plants using cranes.

SUMMARY OF THE INVENTION

Accordingly, an object of the present invention is to provide an apparatus and method of controlling a crane on the basis of reliable level data.

To achieve the above object, there is provided a crane control apparatus comprising: level data memory means (11) for storing level data indicative of levels of the surface of a dump or heap of refuse in pit; means (21) for obtaining an angle of an inclination of the refuse dump on the basis of the level data stored in the level data memory means (11); comparing means (23) for comparing the inclination angle with an angle of repose of the refuse dump; judging means (23), when the inclination angle is larger than the angle of repose, the judging means (23) judging that the level data is improper; altering means (25) for altering the level data as judged to be improper by the judging means (25) so that the inclination angle is below the repose angle; and control means (28, 29) for controlling the crane on the basis of the level data stored in the level data memory means (11).

With such an arrangement, reliable level data is stored into the memory means such as a memory unit for storing level data. The reliable level data guarantees effective and stable control of crane.

DETAILED DESCRIPTION OF THE PREFERRED EMBODIMENTS

The present invention will be described in detail with reference to the accompanying drawings.

Figure 1:
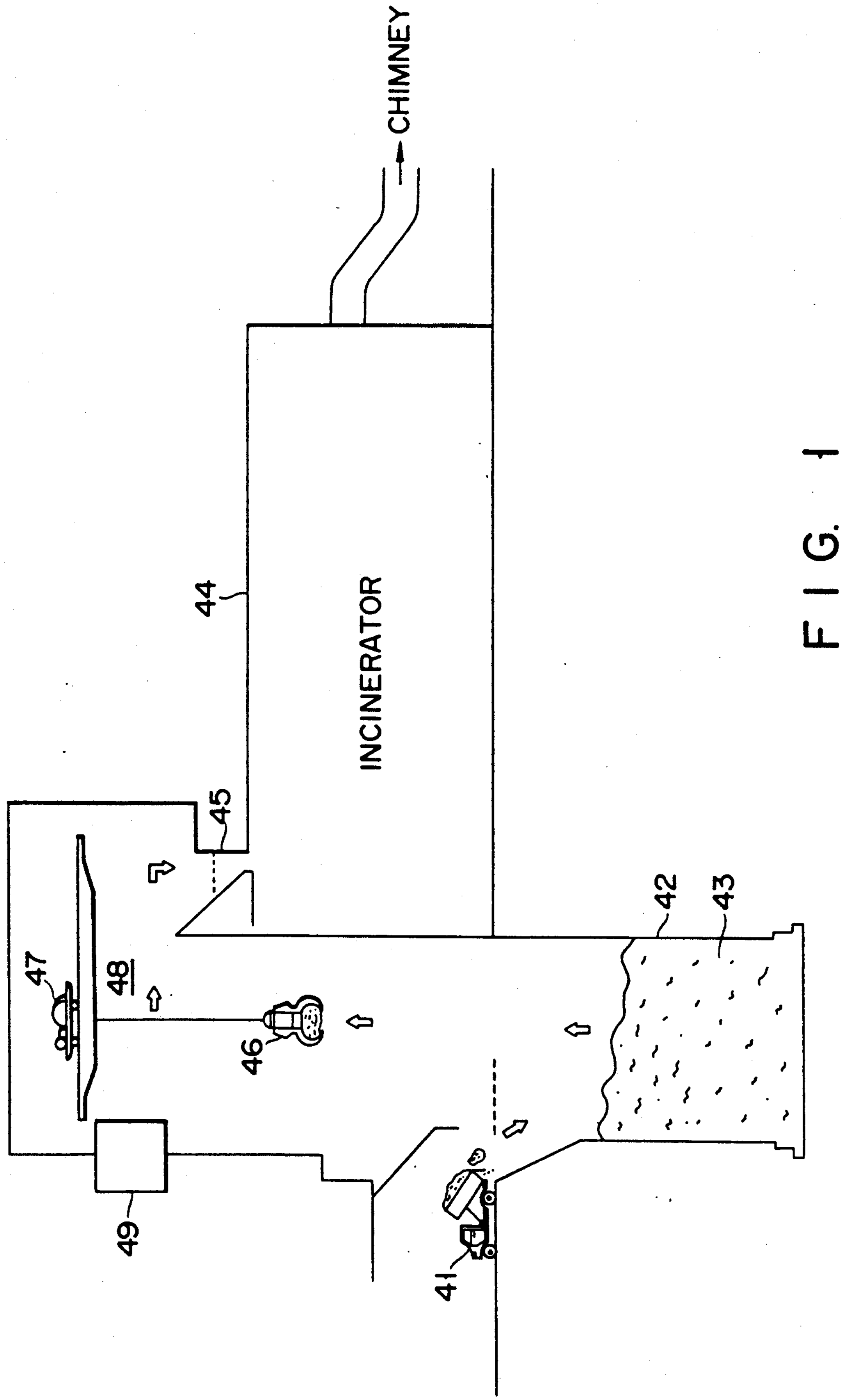
FIG. 1 shows a schematic illustration of an incinerator plant incorporating an apparatus for controlling a refuse disposal crane according to an embodiment of the present invention.

Reference is first made to FIG. 1 showing a schematic illustration of an incinerator plant incorporating an apparatus for controlling a refuse disposal crane according to the present invention.

A disposal truck 41 carries the refuse and dumps it into a pit 42 first for storage. Subsequently, a refuse heap 43 in the pit is picked up and fed into a charging hopper 45 of a furnace 44 with a crane 48. The crane 48 is provided with a bucket 46 and a driver 47 for moving the bucket 46 horizontally and vertically. The crane 48 is moved in accordance with instructions as are given in an operating room 49. The room 49 is provided with a crane controller or a crane control apparatus for controlling the crane 48.

Figure 2:
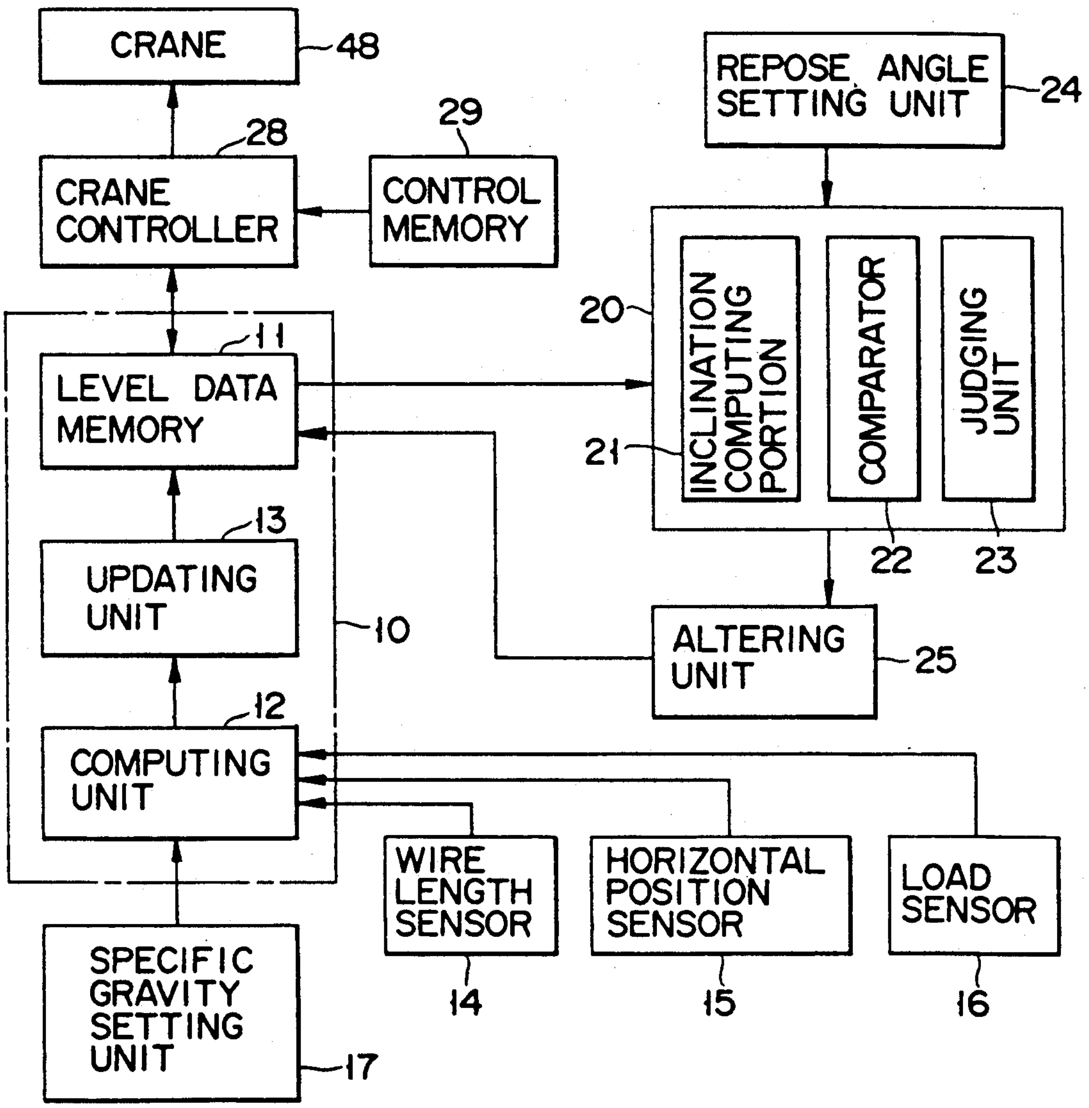
FIG. 2 shows a block diagram of a configuration of a crane control apparatus according to the embodiment of the present invention.

The crane controller is configured as shown in FIG. 2.

As shown, the crane controller contains a level controller 10. The term "level" means a distance between a reference position and the top of a refuse heap in the pit 42. The reference position may be the bottom of the pit 42, for example. The level controller 10 is made up of a level data memory unit 11, a level computing unit 12, and an updating unit 13.

Figure 3:
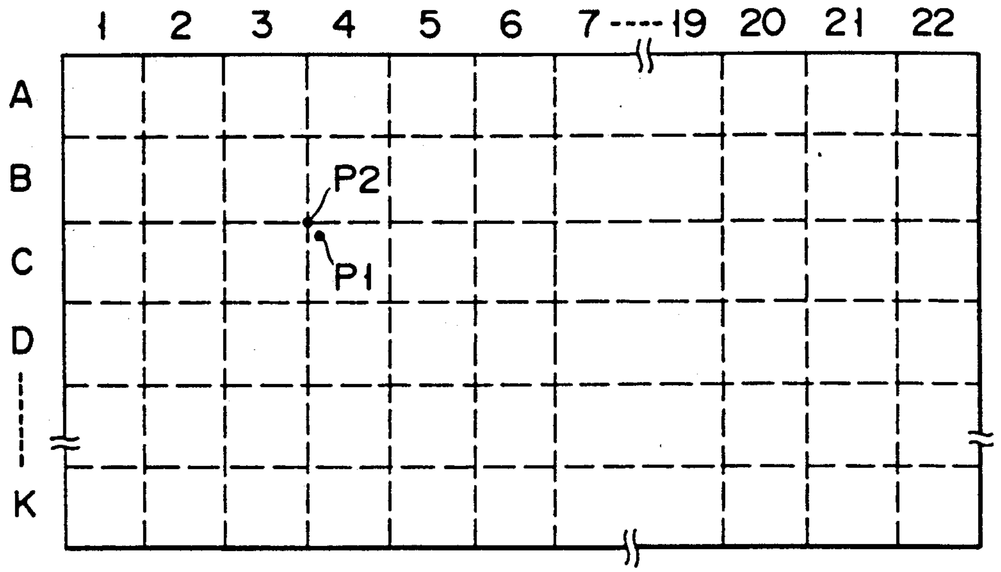
FIG. 3 is a chart showing a plane view of a pit and unit areas.

For preparation of the level data, the bottom of the pit 42 is divided into a number of management unit areas arrayed in a matrix of 22×11 (A to K), as shown in FIG. 3. The levels of the refuse heaps on all unit areas are measured. The data measured are stored as the level data into the memory unit 11.

The size and shape of the unit area may be appropriately selected. Those may be selected in accordance with the size of the bucket in an opened position. In this instance, the unit area is a quarter of the horizontal section of the opened bucket.

The level computing unit 12 computes a level of the refuse dump in each unit area. The level computing unit 12 receives data from a sensor 14 for sensing a length of wire as fed, horizontal position sensor 15, and load sensor 16, which are mounted to the crane 48. Further, the unit 12 receives data representing a specific gravity of the refuse from a specific gravity input unit 17.

The level data memory unit 11 is coupled with a properness check unit 20. The properness check unit 20 checks whether the stored level data is proper or improper a less probability that the level data stored in the memory unit 11 is improper, viz. The correctness check unit 20 is made up of an inclination computing portion 21, angle comparator 22, and judging portion 23. The inclination computing portion 21 obtains angles of the inclinations of the refuse dump in at least two directions in each unit area. The comparator 22 compares the data indicative of each inclination angles, that are derived from the inclination computing portion 21, with an angle of repose (or limit-angle) of the refuse dump entered by a repose-angle input unit 24 or stored in the memory unit 11. The judging portion 23 judges that in specific cases, the level data in a specific unit area is improper or incorrect. The term "an angle of repose of the refuse dump" means a critical angle of the refuse dump. When the inclination angle of the refuse dump exceeds the angle of repose, the refuse dump begins to collapse.

The level memory unit 11 is coupled with a level data altering unit 25. The altering unit 25 alters the level data, which is decided to be improper by the properness check unit 20, to be correct one. Specifically, the altering unit 25 alters the level data stored in the memory unit 11 so that the inclination angle of the refuse dump is below the angle of repose.

The memory unit 11 is coupled with a crane control unit 28, which is further coupled with a control memory 29 storing a crane control program. The crane controller 28 controls the crane 48 by the crane control program of the control memory 29 and the level data of the level data memory 11.

An operation of the crane controller thus arranged will be described.

A first situation will be given in which the crab bucket 46 grabs, lifts and moves the refuse stored in the pit 42 to charge it into the furnace 44. When the crab bucket 46 comes in contact with the surface of the refuse dump 43, a value derived from the load sensor 16 becomes small. The horizontal position sensor 15 provides a horizontal position of the crab 46 (expressed in terms of the X–Y coordinates, for example) when the crab 46 is in contact with the refuse dump 43. When a value of the load sensor 14 becomes small, the wire length sensor 14 provides a level H of the refuse dump 43 at a point where the crab is in contact with the refuse dump. The horizontal position of the crab 46 at the contact point is approximated to a cross point of lines defining the unit areas (see FIG. 3). When the position of the crab sensed by the sensor 15 is P1, for example, in FIG. 3, it is approximated to a position P2.

When the crab 46 grabs and raises the refuse, a weight G of the grabbed refuse is obtained by using an output signal of the load sensor 16. The level computing unit 12 divides the weight G of the refuse by a specific gravity C derived from the specific gravity input unit 17, thereby obtaining a volume V of the grabbed refuse. As already stated, the unit area is the quarter of the horizontal cross-section area of the bucket 46. Accordingly, the level computing unit 12 considers the computed volume V as that of the refuse obtained by equally picking u the refuse in the four adjacent unit areas about the cross point P2. The level computing unit 12 divides the volume V by the area 4S as the sum of the four unit areas, and subtracts the obtained quotient from the level H of the refuse dump. The result is a new level H-V/(4S) of the refuse dump in the four unit areas about the cross point P1.

When the refuse is dumped into the pit 42 with the crane 48, the level computing unit adds an increase V/(4S) of in the height of the refuse heap to a level H of the refuse dump which has been obtained by the wire length sensor 14. The remaining points in this operation are the same as those in the above operation of picking up the refuse from the pit.

The levels of the four refuse dumps thus obtained are supplied to the updating unit 13. The updating unit 13 replaces the old level data in the memory unit 11 with the new levels of the refuse dumps.

After the level data in the memory unit 11 are updated, the properness check unit 21 checks the properness of the new level data in the memory unit 1.

Figure 4:
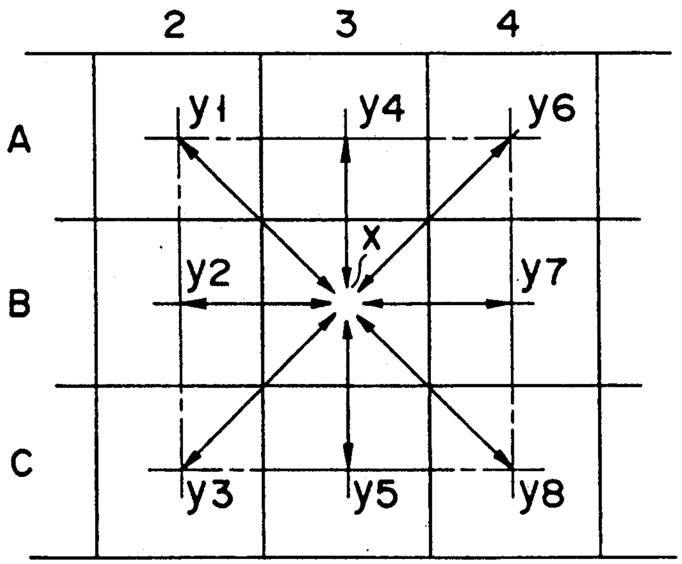
FIG. 4 and 5 show diagrams useful in explaining how to obtain angles of inclinations of the refuse dump in different unit areas.
Figure 5:
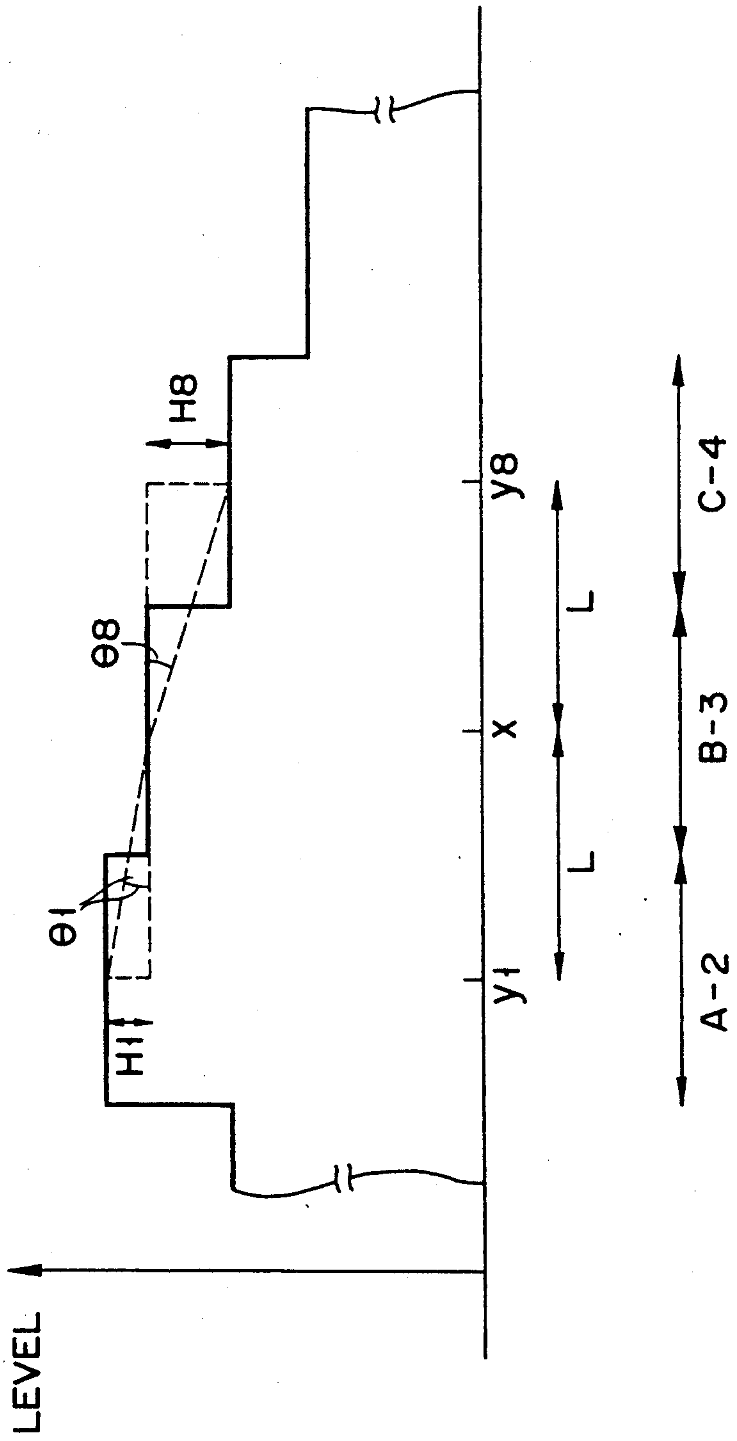

How to check the level data properness will be described with reference to FIGS. 4 and 5. For example, in case that the level data in the unit areas B-3, B-4, C-3 and C-4 around the point P2 in FIG. 3 are updated, the check unit 20 exercizes the properness of those items of level data in successive order.

The checking of the properness of the level data in the unit area B-3 follows. In FIG. 4, character x indicates a center of the unit area B-3 of the refuse dump to be subjected to the properness check. Symbols y1 to y8 indicate the centers of eight unit areas around the unit area B-3. FIG. 5 shows the levels of the refuse dump that are represented by the level data on lines y1 to y8 in FIG. 4.

The inclination detector 21 of the properness check unit 20 obtains a distance L1 between point x and point y1. The distance L1 is worked out on the basis of the triangle method by using the known unit area. Then, the inclination detector 21 works out a difference H1 between the level data of the two unit areas. The inclination detector 21 computes an angle $\theta 1$ of inclination by, for example, the following formula $$\theta 1 = \tan H1/L1$$

Subsequently, the inclination angles $\theta 2$ to $\theta 8$ for the remaining points y2 to y8 are calculated in similar ways.

The comparators 22 of the check unit 20 successively compares the inclination angles $\theta 1$ to $\theta 8$ with preset angle of repose. Usually, the angle of repose are 58° to 63°. The judging portion 23 of the check unit 20 counts the number of the inclination angle exceeding the repose-angle on the basis of the results of the comparisons. When the number of such inclination angles exceeds a predetermined percentage, for example, 50%, the judging portion 23 judges that the level data in the unit area B-3 is improper. When the number of such inclination angles is below a predetermined percentage, for example, 50%, the judging portion 23 judges that the level data in the unit area B-3 is proper.

The properness check process as just mentioned is applied to the remaining unit areas B-4, C-3, C-4 in similar ways.

The judging results by the properness check unit 21 are supplied to the altering unit 25. When the level data in the unit area B-3 is improper, the altering unit 25 alters the level data in the unit area B-3, so that the inclination angles, which are obtained from the level data in the unit area B-3 and the level data in the unit areas around the former, are within the preset angle of repose. The data alteration may be attained by obtaining a mean value of the levels in the unit areas around it. Alternatively, it may be attained by such a calculation that calculating all of the inclination angles θ1 to θ8 fall within the repose angle, in connection with the level data in the neighbor unit areas. A specific example of the data alteration will be given. In this example, the level data is incremented or decremented in steps of a preset value so that the inclination angle for the improper level data is below the repose angle. As the result of the level data alteration, such a situation occurs that the inclination angle, thus far, below the repose angle becomes in excess of the repose angle. To cope with this, the number of inclination angles in excess of the repose angle is obtained for each incremented or decremented level data. The level data of the least number is selected as the level data after the alteration.

The crane control unit 28 exercizes the crane control by using the control program stored in the control memory 29 and the level data stored in the level data memory unit 11. The known crane control system using the level data memory unit, is available for the crane control in this instance. For example, the crane control unit 28 detects an undulation of the surface of the refuse dump 43 on the basis of the level data stored in the level data memory unit 11. Then, it recognizes an amount of lift of the crane 48, and moves the crab bucket 46.

It should be understood that the present invention is not limited to the above specific examples.

For example, the shape and size of the crab bucket 46 are not limited to the above ones. The same thing is true for the shape and size of the unit area. For example, the unit area may be ¼ or 1/16 of the plane area of the crab 46. Further, the combination of the upper/lower limit check as already mentioned and the check method in the above-mentioned embodiment may be used.

Figure 6:
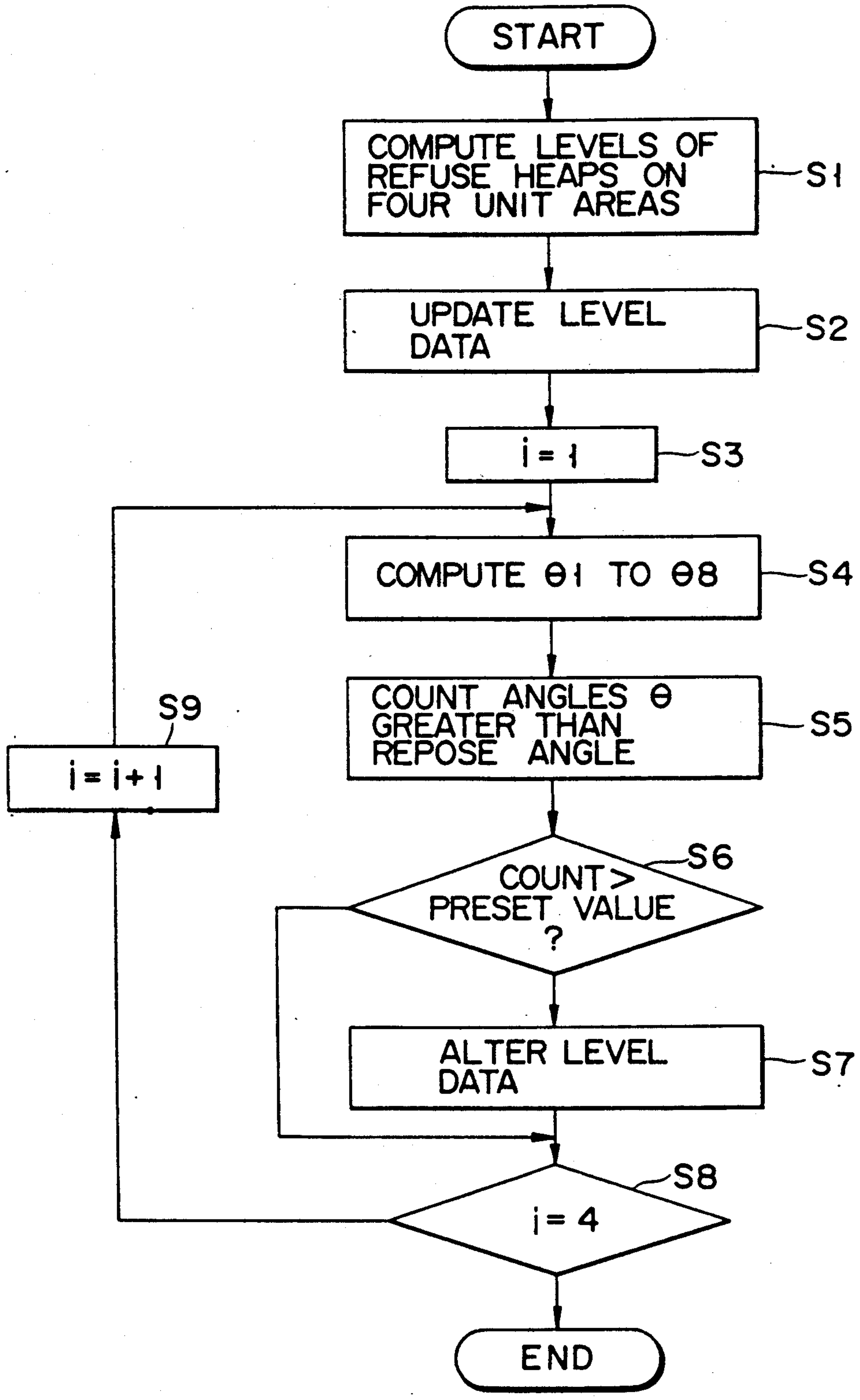
FIG. 6 is a flowchart showing a flow of control by a crane control apparatus according to another embodiment of the present invention.

In the above instance, the crane control unit is expressed in terms of the circuit block diagram. If necessary, it may be realized by the combination of a microcomputer and a control software. In this case, a sequence of the operations of the microcomputer is substantially the same as that in the circuit block as mentioned above. A specific example of a control flow by the microcomputer will be described with reference to FIG. 6.

In a response to an operation of the crane, control computes new levels in the four unit areas of a refuse dump (step S1). Control replaces the old level data in the memory unit with the ne level data calculated in successive manner (step S2). Of those four unit areas of the updated level data, the unit area whose denotation "i" is "1" is picked up (step S3). Control computes the inclination angles θ1 to θ8 (step S4), and then counts the number of the inclination angles in excess of the angle of repose (step S5). Control checks if the resultant count exceeds a preset value (step S6). If the answer is YES, control alters the level data in the manner as mentioned above (step S7). Further, control checks if the process of operation has been applied to all of the unit areas (step S8). If the answer is NO, control increments the number "i" of the unit area by one (step S9), and repeats the sequence of operations from step S4 to step S8. When the above sequences of operations for the four unit areas have been completed, the control by the microprocessor ends.

While in the above-mentioned embodiment, the present invention is applied to a crane control apparatus in a incinerator plant, it is evident that the present invention is applicable for a crane control apparatus in other fields, such as plants handling coal, lime, etc., and reclaiming by refuse, earth and sand, and the like. The pit is not limited to the illustrated one, but may be the land on which earth and sand are heaped up.

In the above instance, eight directions are used. However, in the case of the unit area A-2, for example, five directions suffice, because the data properness check is needed for only the unit areas on the inner side. If required, two or four directions may be used for obtaining the inclination angles to be compared with the angle of repose. In the unit area B-3, for example, points y1, y3, y6 and y8 alone may be used.

As seen from the foregoing description, inclination angles of a refuse dump are obtained by the level data differences and the distances from a unit area to other unit areas lying in different directions. When the greater number of the inclination angles obtained are in excess of the repose-angle, the level data in that unit area is treated as the improper level data. The crane control apparatus according to the present invention, unlike the conventional upper/lower limit check method, can recognize the level data to be improper in connection with the correlation of the level data, even if the level data exists between the upper and the lower limit values, provided that the difference between the level data in the adjacent unit areas is improper. Further, the level data in the specific unit area s altered such that the inclination of the data is within the angle of repose. Because of such an alteration of the level data, the data alteration will never be excessive. The direction of an excessive level of the abnormal data is allowed for in the alteration of the level data. Accordingly, the data is properly altered.

What is claimed is:

1. A crane system in a refuse plant comprising:

a pit for receiving refuse;

a crane for carrying the refuse;

sensor means for detecting a position and an amount of the refuse when said crane lifts and moves the refuse into said pit;

level data memory means for storing level data indicative of levels of a surface of a dump of the refuse in the pit;

obtaining means, connected to said level data memory means, for obtaining an angle of an inclination of the refuse dump on the basis of the level data stored in said level data memory means;

comparing means for comparing said inclination angle with an angle of repose of the refuse dump;

determination means for, when said inclination angle is larger than said angle of repose, determining that said level data is improper;

altering means, connected to said sensor means and said level data memory means, for updating the level data stored in said level data memory means on the basis of a result detected by said sensor means and altering said level data, when determined to be improper by said determination means, so that said inclination angle is below said repose angle; and control means, connected to said level data memory means and said crane, for controlling said crane on the basis of the level data stored in said level data memory means.

2. The crane system according to claim 1, in which said obtaining means obtains the angles of inclinations of the refuse dump in different directions on the basis of said level data, said comparing means compares each said inclination angle with said repose angle, and said determination means determines that said level data is improper when a majority of said inclination angles are in excess of said repose angle.

3. The crane system according to claim 1, in which said level data memory means stores level data in predetermined unit areas constituting a cross section of said pit, said inclination angle obtaining means obtains the angles of a plurality of inclinations of the refuse dump on the basis of the level data of a unit area and the level data of a plurality of unit areas adjacent to said unit area, said comparing means compares each said inclination angle with said repose angle, said determination means determines that said level data is improper when a majority of said inclination angles are in excess of said repose angle.

4. The crane system according to claim 1, wherein said altering means updates the level data stored in said level data memory means every time said crane dumps the refuse into the pit or picks up the refuse from the pit, and said obtaining means, said comparing means and said determination means operate every time said level data is updated.

5. The crane system according to claim 1, in which said level data memory means stores level data of each unit area of the pit, said unit area being 1/n (n=integer) of a plane area of a grabbing means of said crane, every time said crane dumps the refuse into a unit area of the pit or picks up the refuse from said unit area, said altering means updates the level data in said unit area, said inclination angle obtaining means obtains angles of a plurality of inclinations in unit areas whose level data have been updated, on the basis of the level data in a plurality of unit areas adjacent to each said unit area whose level data has been updated, and said comparing means comparing said angle of repose with said inclination angle of each said unit area whose level data has been updated.

6. The crane system according to claim 1, in which said altering means updates the level data when determined to be improper, and obtains, for each updated level data, number of inclination angles exceeding an angle of repose, wherein said updated level data having the smallest number of said inclination angles exceeding the angle of repose is selected as altered level data.

7. A level data check method comprising the steps of:
- storing level data indicative of levels of a surface of a dump of refuse;
- detecting a position and an amount of the refuse when a crane lifts and moves the refuse into a pit;
- obtaining, in response to a detection result of said detecting step, at least one angle of an inclination of the refuse dump;
- comparing said inclination angle with an angle of repose of the refuse dump;
- detecting whether the level data is proper based on comparison result of said comparing step;
- altering said level data as detected to be improper in said detecting step so that said inclination angle is below said repose angle; and
- controlling the crane in accordance with the level data stored in said level data storing step.

8. The method according to claim 7, in which said altering step updates the level data detected to be improper, and obtains, for each updated level data, the number of inclination angles exceeding an angle of repose, and the wherein said updated level data having the smallest number of said inclination angles exceeding the angle of repose is selected as altered level data.

9. The method according to claim 7, in which said inclination angle obtaining step obtains the angles of inclinations of the refuse dump in different directions on the basis of said level data, said comparing step compares each said inclination angle with said repose angle, and said detecting step detects that said level data is improper when a majority number of said inclination angles are in excess of said repose angle.

10. The method according to claim 7, in which said level data storing step stores level data of each unit area where the refuse dump is placed, said inclination angle obtaining step obtains the angles of a plurality of inclinations of the refuse dump on the basis of the level data of a unit area and the level data of a plurality of unit areas adjacent to said unit area, said comparing step compares each said inclination angle with said repose angle, said detecting step detects that said level data is improper when a majority of said inclination angles are in excess of said repose angle.

11. The method according to claim 7, in which said level data is updated every time said crane dumps the refuse into the pit or picks up the refuse from the pit, and said inclination angle obtaining step, said comparing step, and said detecting step are executed every time said level data is updated.

12. The method according to claim 7, in which the level data of each unit area is stored, said unit area being 1/n (n=integer) of a horizontal cross-section of a grabbing means of said crane, every time said crane dumps the refuse into a unit area of the pit or picks up the refuse from said unit area, said level data storing step updates the level data in said unit area, said obtaining step obtains angles of a plurality of inclinations in unit areas whose level data have been updated, on the basis of the level data in a plurality of unit areas adjacent to each said unit area whose level data has been updated, and said comparing step comparing said angle of repose with s id inclination angle of each said unit area whose level data has been updated.

13. A crane control apparatus comprising:
- level data memory means for storing level data indicative of levels of a surface of a heap of an object to be moved by a crane;
- means, connected to said level data memory, for obtaining at least one angle of an inclination of the heap of the object on the basis of the level data stored in said level data memory means;
- comparing means for comparing said inclination angle with an angle of repose of the heap of the object;
- detecting means for detecting whether said level data is improper or not based on a comparison result of said comparing means; and
- control means, connected to said level data memory means, for controlling said crane on the basis of the level data stored in said level data memory means.

14. The crane control apparatus according to claim 13, further comprising altering means for altering said level data, when detected to be improper by said detecting means, so that inclination angle is below said repose angle.

15. The crane control apparatus according to claim 14, in which said altering means alters the level data, when detected to be improper and obtains a number of inclination angles exceeding an angle of repose, and altered level data having the smallest number of said inclination angles exceeding the angle of repose is selected as proper level data.

16. The crane control apparatus according to claim 13, in which said obtaining means obtains the angles of inclinations of said heap in different directions on the basis of said level data, said comparing means compares each said inclination angle with said repose angle, and said detecting means detects that said level data is improper when a majority of said inclination angles are in excess of said repose angle.

17. The crane control apparatus according to claim 13, in which said level data memory means stores level data in each of unit areas where said object is placed, said inclination angle obtaining means obtains the angles of a plurality of inclinations of the refuse dump on the basis of the level data of a unit area and the level data of a plurality of unit areas adjacent to said unit area, said comparing means compares each said inclination angle with said repose angle, said detecting means detects that said level data is improper when a majority of said inclination angles are in excess of said repose angle.

* * * * *